US012350902B2

(12) United States Patent
Ohnishi et al.

(10) Patent No.: US 12,350,902 B2
(45) Date of Patent: Jul. 8, 2025

(54) BAG MAKING METHOD AND BAG MAKING APPARATUS

(71) Applicant: Totani Corporation, Kyoto (JP)

(72) Inventors: Yuji Ohnishi, Kyoto (JP); Toshiki Nagasawa, Kyoto (JP)

(73) Assignee: Totani Corporation, Kyoto (JP)

( * ) Notice: Subject to any disclaimer, the term of this patent is extended or adjusted under 35 U.S.C. 154(b) by 0 days.

(21) Appl. No.: 18/418,418

(22) Filed: Jan. 22, 2024

(65) Prior Publication Data

US 2024/0198622 A1 Jun. 20, 2024

Related U.S. Application Data

(62) Division of application No. 17/611,576, filed as application No. PCT/JP2020/010795 on Mar. 12, 2020, now Pat. No. 11,926,118.

(30) Foreign Application Priority Data

May 21, 2019 (JP) ................................ 2019-094925

(51) Int. Cl.
*B31B 70/26* (2017.01)
*B31B 70/10* (2017.01)
(Continued)

(52) U.S. Cl.
CPC ............ *B31B 70/266* (2017.08); *B31B 70/10* (2017.08); *B31B 70/16* (2017.08); *B31B 70/644* (2017.08);
(Continued)

(58) Field of Classification Search
CPC ..... B31B 70/266; B31B 70/644; B31B 70/10; B31B 70/16; B31B 2155/002; B31B 2160/20; B31B 2155/001
(Continued)

(56) References Cited

U.S. PATENT DOCUMENTS 10,493,715 B2 * 12/2019 Totani .................... B31B 50/18
2005/0272583 A1 * 12/2005 Totani .................... B31B 70/00 493/162
(Continued)

FOREIGN PATENT DOCUMENTS

CN 103171170 A 6/2013
JP 10217364 A 8/1998
(Continued)

OTHER PUBLICATIONS

International Search Report issued Jun. 9, 2020 by the International Searching Authority (Japan Patent Office) in International Application No. PCT/JP2020/010795.

*Primary Examiner* — Sameh Tawfik

(74) *Attorney, Agent, or Firm* — NovoTechIP International PLLC

(57) ABSTRACT

The product efficiency of bags each with an end face part is increased. A panel webs is guided to be divided along a line of weakness of the panel web and to be folded along division edges of the panel web. This guiding of the first panel and temporary sealed sections cause a side gusset to be cut open along a line of weakness of the side gusset such that open surfaces are formed. After the forming of the open surfaces, an end face web is supplied to be superposed on folded parts of the panel web and the open surfaces of the side gusset.

5 Claims, 16 Drawing Sheets

(51) Int. Cl.

| | |
|---|---|
| ***B31B 70/16*** | (2017.01) |
| ***B31B 70/64*** | (2017.01) |
| *B31B 155/00* | (2017.01) |
| *B31B 160/20* | (2017.01) |

(52) U.S. Cl.
CPC ... *B31B 2155/001* (2017.08); *B31B 2155/002* (2017.08); *B31B 2160/20* (2017.08)

(58) Field of Classification Search
USPC .......................................................... 493/199
See application file for complete search history.

(56) References Cited

U.S. PATENT DOCUMENTS

| | | | | |
|---|---|---|---|---|
| 2011/0039676 | A1 | 2/2011 | Totani | |
| 2019/0308384 | A1 * | 10/2019 | Totani | B31B 70/844 |

FOREIGN PATENT DOCUMENTS

| | | | |
|---|---|---|---|
| JP | 2003267402 | A | 9/2003 |
| JP | 3655627 | B2 | 6/2005 |
| JP | 5584815 | B1 * | 9/2014 |
| JP | 2015189089 | A | 11/2015 |
| JP | 2017128017 | A | 7/2017 |
| WO | 2009131214 | A1 | 10/2009 |
| WO | 2018012542 | A1 | 1/2018 |

* cited by examiner

BAG MAKING METHOD AND BAG MAKING APPARATUS

CROSS-REFERENCE TO RELATED APPLICATIONS

This application is a Divisional of U.S. patent application Ser. No. 17/611,576 filed Nov. 16, 2021, which is a 371 of International Application No. PCT/JP2020/010795 filed Mar. 12, 2020, which claims the benefit of priority to Japanese Patent Application No. 2019-094925 filed May 21, 2019, the contents of which are incorporated herein by reference in their entirety.

TECHNICAL FIELD

This application relates to a method and an apparatus for making bags each having an end face part.

BACKGROUND

A bag such as a plastic bag includes, for example, panel parts, side gusset parts and an end face part. The end face part may be a bottom face part, in particular a bottom gusset part. This kind of bag can be called a square bottom bag (or flat bottom bag). Patent document 1 (WO2018/012542 A1) and Patent document 2 (JP3655627 B1) disclose bag making methods for making such bags.

A bag making method, for example, superposes two panel webs on each other and feeds them in their longitudinal direction. The bag making method incorporates side gussets and an end face web (bottom gusset web) into the panel webs. The bag making method heat-seals the panel webs, the side gussets and the end face web. The bag making method cross-cuts the panel webs, the side gussets and the end face web in the width direction of the panel webs, thereby making bags. The bag making method forms the panel parts from the panel webs, the side gusset parts from the side gussets, and the end face part from the end face web.

Patent document 1 discloses two types of the bag making methods. One of the bag making methods makes a bag per every cross-cutting. The other bag making method makes two bags per every cross-cutting. The former is called single-line bag making, and the latter is called two-line bag making. The two-line bag making has been attracting attention from the viewpoint of production efficiency.

The latter bag making method includes a step for disposing two side gussets between two upper and lower panel webs and a step for temporarily sealing the side gussets to the upper and lower panel webs. The bag making method further includes a step for dividing the upper panel web into two along its longitudinal direction and a step for supplying an end face web to the lower panel web through a gap between the divided upper panel web to temporarily fix the end face web to the lower panel web. The bag making method further includes a step for folding the upper panel web on the sides of its division edges to open the two side gussets by means of this folding and the temporary seal, thereby forming open surfaces.

In order to achieve this, the step for disposing the side gussets requires locating one side gusset on one side with respect to the division line of the upper panel web and the other side gusset on the other side with respect to the division line to align these two side gussets in a single line in the width direction of the panel webs. This means that the operation of supplying a side gusset must be required twice. This is one of the factors which reduce the product efficiency.

An object of the present application is to provide a method and an apparatus capable of effectively making bags each having end face part.

SUMMARY

According to an aspect of the present application, there is provided a method for making plastic bags, the method including: superposing a first panel web and a second panel web on each other and feeding the first and second panel webs in a longitudinal direction of the first and second panel webs; and before superposing of the first and second panel webs, supplying a side gusset to the first or second panel web to dispose the side gusset in a width direction of the first and second panel webs such that the side gusset is interposed between the first and second panel webs when the first and second panel webs are superposed on each other. Here, the side gusset is folded in halves on opposite sides with respect to a longitudinal centerline thereof. The method further includes: after the superposing of the first and second panel webs, sealing the side gusset to the first and second panel webs to form temporary sealed sections; and after forming of the temporary sealed sections, guiding the first panel web as the first and second panel webs are fed, to divide the first panel web along a first line of weakness and to fold the first panel web on sides of division edges of the first panel web along fold lines. Here, the first line of weakness is formed in the first panel web to extend in the longitudinal direction of the first and second panel webs, and the fold lines extend in the longitudinal direction of the first and second panel webs. The method further includes cutting the side gusset open along a second line of weakness by means of guiding of the first panel web and the temporary sealed sections to form open surfaces. Here, the second line of weakness is formed in the side gusset to extend in a width direction of the side gusset and aligned with the first line of weakness. The method further includes: supplying an end face web to the first panel web as the first and second panel webs are fed, to dispose the end face web in the longitudinal direction of the first and second panel webs so as to superpose the end face web on folded parts of the first panel web and the open surfaces of the side gusset; and forming panel parts of bags from the first and second panel webs, side gusset parts of the bags from the side gusset, and end face parts of the bags from the end face web.

The method may further include: forming the first line of weakness in the first panel web before superposing the first and second panel webs on each other; and aligning the second line of weakness with the first line of weakness when superposing the first and second panel webs on each other.

The first line of weakness and the second line of weakness may be perforations. The method may further include forming the perforations in the first panel web and the side gusset using a perforation cutter after superposing the first and second panel webs on each other.

The perforations as the second line of weakness may include: a first slit located in a widthwise middle section of the side gusset; and second slits located on opposite sides with respect to the first slit. A length of the first slit in the width direction of the side gusset may be longer than a length of each of the second slits in the width direction of the side gusset.

The method may further include: after supply of the end face web, heat-scaling the side gusset to the first and second panel webs and the end face web in the width direction of the first and second panel webs to form an auxiliary sealed section at least along a diagonal line of each of the open surfaces; and after forming of the auxiliary sealed section, guiding the first panel web as the first and second panel webs are fed, to fold the first panel web back along the fold lines, wherein folding back of the first panel web may cause the open surfaces to be closed and the end face web to be folded in halve.

The method may further include: after the folding back of the first panel web, heat-scaling the end face web to the first and second panel webs in the longitudinal direction of the first and second panel webs along the division edges to form a longitudinal sealed section.

The method may further include: after supply of the end face web, heat-scaling the side gusset to the first and second panel webs and the end face web in the width direction of the first and second panel webs to form a cross sealed section at least over an entire length of the side gusset; after forming of the cross sealed section, slitting the first and second panel webs, the side gusset and the end face web in the longitudinal direction of the first and second panel webs along the division edges of the first panel web; and after slitting, cross-cutting the first and second panel webs, the side gusset and the end face web in the width direction of the first and second panel webs in a position of the cross sealed section to make the bags.

According to a second aspect of the present application, there is provided an apparatus for making plastic bags, the apparatus comprising: a panel web feed device configured to superpose a first panel web and a second panel web on each other and to feed the first and second panel webs in a longitudinal direction of the first and second panel webs; a side gusset supply device configured to, before superposing of the first and second panel webs, supply a side gusset to the first or second panel web so as to dispose the side gusset in a width direction of the first and second panel webs such that the side gusset is interposed between the first and second panel webs when the first and second panel webs are superposed on each other. Here, the side gusset is folded in halves on opposite sides with respect to a longitudinal centerline thereof. The apparatus further includes: a temporary seal device configured to, after the superposing of the first and second panel webs, seal the side gusset to the first and second panel webs so as to form temporary sealed sections; and a first guide device configured to guide the first panel web as the first and second panel webs are fed, so as to divide the first panel web along a first line of weakness and so as to fold the first panel web on sides of division edges of the first panel web along fold lines. The side gusset is cut open along a second line of weakness by means of the temporary sealed sections and guiding of the first panel web by the first guide device to form open surfaces. Here, the first line of weakness is formed in the first panel web to extend in the longitudinal direction of the first and second panel webs, the fold lines extend in the longitudinal direction of the first and second panel webs, and the second line of weakness is formed in the side gusset to extend in a width direction of the side gusset and aligned with the first line of weakness. The apparatus further includes an end face web supply device configured to supply an end face web to the first panel web as the first and second panel webs are fed, so as to dispose the end face web in the longitudinal direction of the first and second panel webs such that the end face web is superposed on folded parts of the first panel web and the open surfaces. The apparatus is configured to form panel parts of bags from the first and second panel webs, side gusset parts of the bags from the side gusset, and end face parts of the bags from the end face web.

The apparatus may further include a line-of-weakness forming device disposed downstream of a position where the panel web feed device superposes the first and second webs on each other, and configured to form the first line of weakness and the second line of weakness in the first panel web and the side gusset, respectively.

The first line of weakness and the second line of weakness may be perforations. The line-of-weakness forming device may include a disk-shaped perforation cutter for forming the perforations, and be configured to allow adjustment of cutting depth of the disk-shaped perforation cutter into the first panel web and the side gusset.

The line-of weakness forming device may further includes an arm supported at one end thereof to be pivotable around a pivot shaft extending in the width direction of the first and second panel webs. The disk-shaped perforation cutter may have a rotation shaft extending in the width direction of the first and second panel webs and be supported by the arm to be rotatable around the rotation shaft. The line-of-weakness forming device may further include: a biasing member disposed to bias the arm in the direction in which the disk-shaped perforation cutter is away from a feed plane of the first and second panel webs; and an adjustment member contacting the arm to prevent the arm from being moved around the pivot shaft by the biasing member, and used for adjusting the cutting depth.

The apparatus may further include: an open surface seal device configured to, after supply of the end face web, heat-seal the side gusset to the first and second panel webs and the end face web in the width direction of the first and second panel webs to form an auxiliary sealed section at least along a diagonal line of each of the open surfaces; and a second guide device configured to, after forming of the auxiliary sealed section, guide the first panel web as the first and second panel webs are fed so as to fold the first panel web back along the fold lines, wherein folding back of the first panel web causes the end face web to be folded in halve.

The apparatus may further include a longitudinal seal device configured to, after the folding back of the first panel web, heat-seal the end face web to the first and second panel webs in the longitudinal direction of the first and second panel webs along the division edges so as to form a longitudinal sealed section.

The apparatus may further include: a cross seal device configured to, after supply of the end face web, heat-seal the side gusset to the first and second panel webs and the end face web in the width direction of the first and second panel webs so as to form a cross sealed section at least over an entire length of the side gusset; a slit device configured to, after forming of the cross sealed section, slit the first and second panel webs, the side gusset and the end face web in the longitudinal direction of the first and second panel webs along the division edges of the first panel web; and a cross cut device configured to, after slitting, cross-cut the first and second panel webs, the side gusset and the end face web in the width direction of the first and second panel webs in a position of the cross sealed section such that the bags are made.

DETAILED DESCRIPTION

Hereinafter, a bag making method (method for making bags) and a bag making apparatus (apparatus for making bags) according to implementations will be described with reference to the drawings.

Figure 1A:
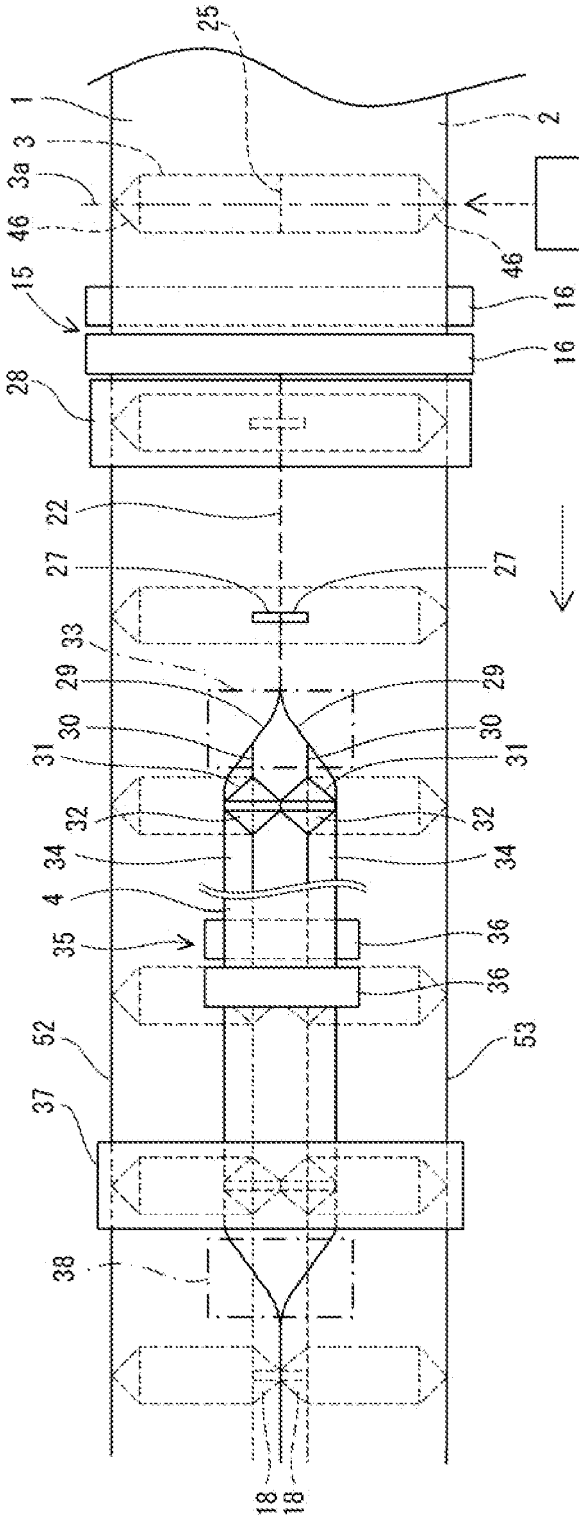
FIG. 1A is a schematic plan view of an upstream section of a bag making apparatus according to an implementation.
Figure 1B:
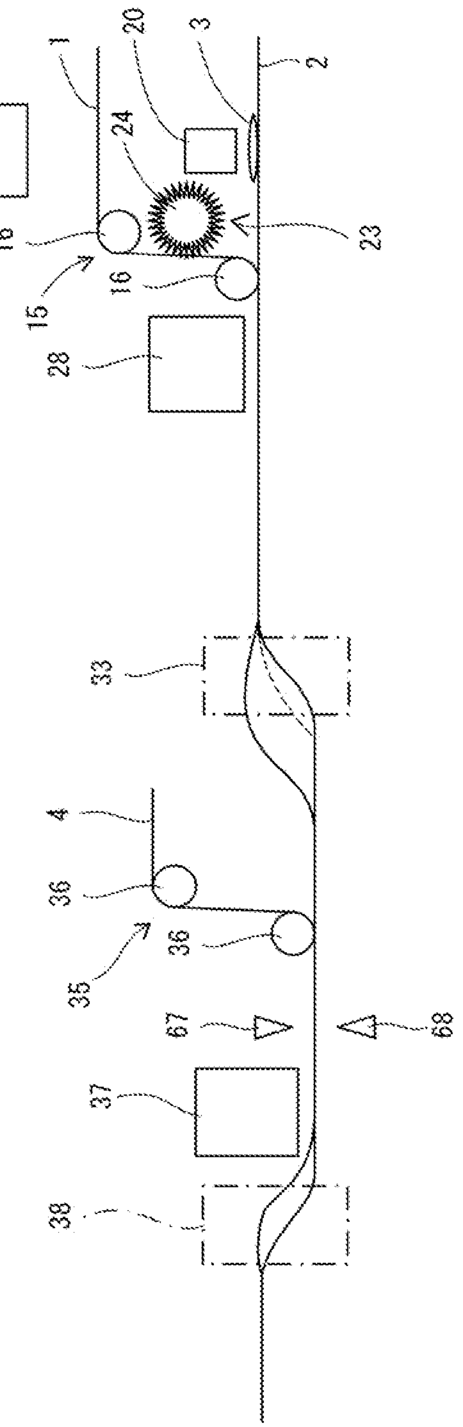
FIG. 1B is a schematic side view of FIG. 1A.
Figure 2:
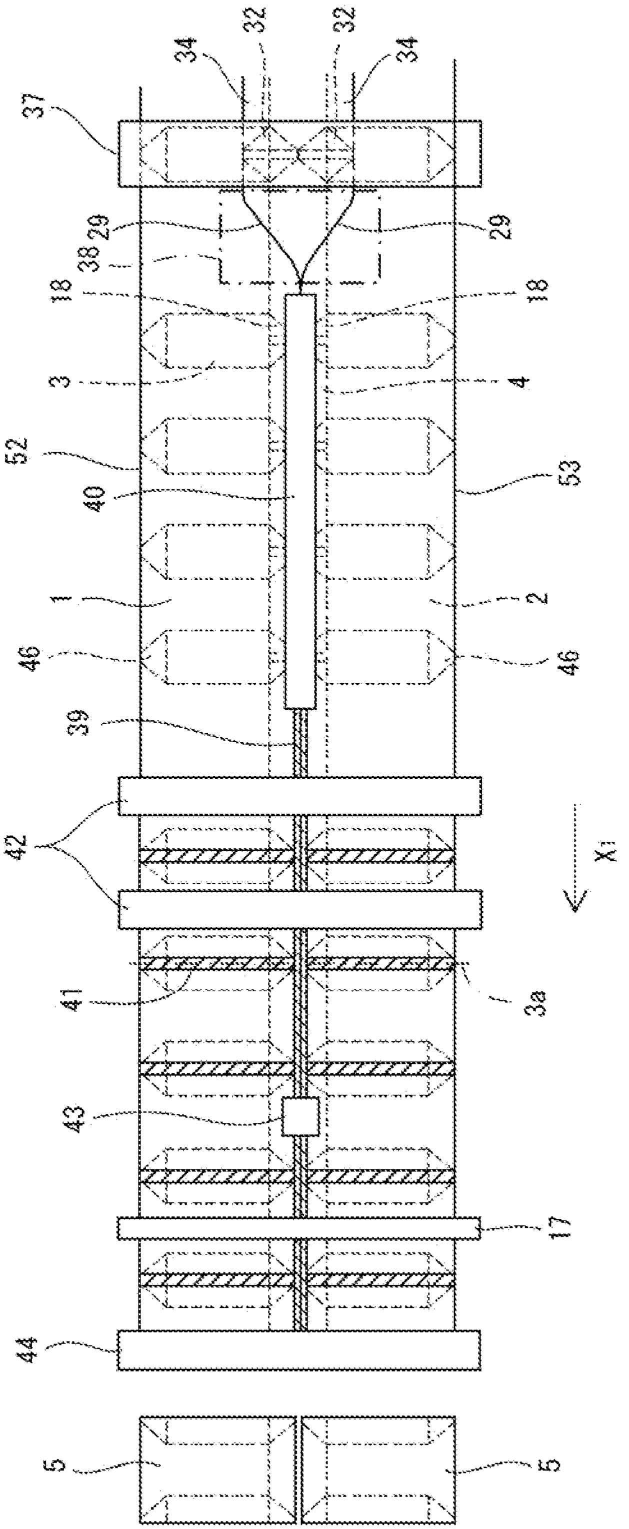
FIG. 2 is a schematic plan view of a downstream section of the bag making apparatus in FIG. 1A.
Figure 3:
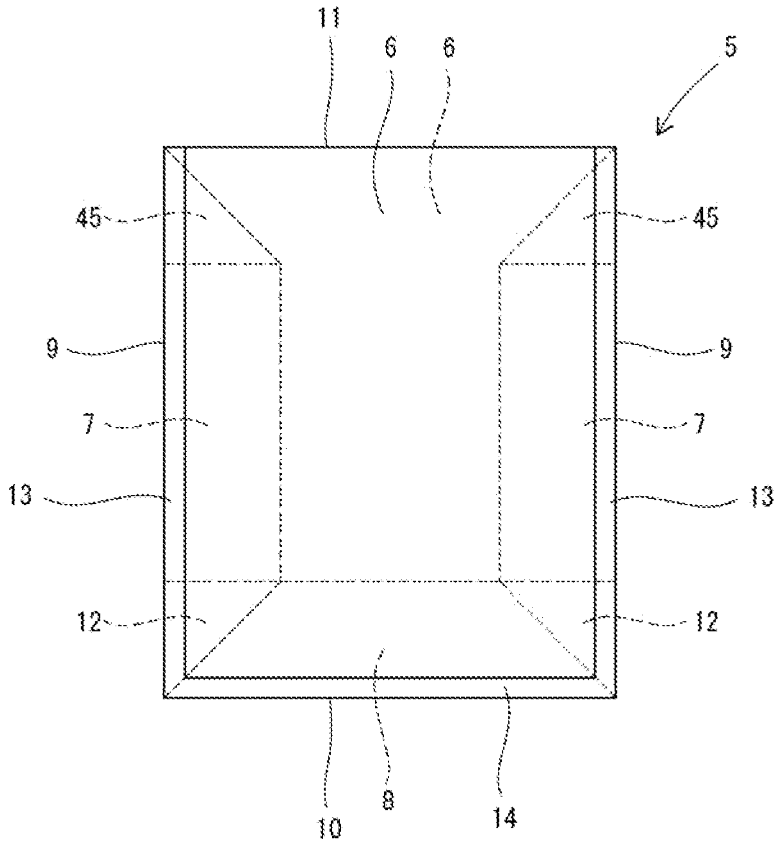
FIG. 3 illustrates a bag.

A bag making apparatus according to an implementation is illustrated in FIG. 1A, FIG. 1B and FIG. 2. The bag making apparatus is configured to make plastic bags of FIG. 3 from a first panel web 1, a second panel web 2, a side gusset 3 and an end face web 4. In each of the following implementations, the bag 5 is a square bottom bag and is also a plastic bag, and the first panel web 1, the second panel web 2, the side gusset 3 and the end face web 4 are plastic films. Instead of the plastic films, each of these components 1 to 4 may include for example a base made of paper and a film or plastic material partially or fully laminated to the base.

The bag 5 includes two panel parts 6, two side gusset parts 7 and an end face part 8. The two panel parts 6 face each other to have opposite side edges 9 and opposite end edges 10 and 11. One end edge is a bottom edge 10, and the other end edge is a top edge 11.

The two side gusset parts 7 form a pair. The pair of side gusset parts 7 extends along the opposite side edges 9, is folded in half and interposed between the two panel parts 6. One end portion of each side gusset part 7 is folded in half and interposed between the two layers of the side gusset part 7, so that an auxiliary gusset part 12 is formed. The other end portion of the side gusset part 7 is folded toward the outer surface of the side gusset part 7 as it remains folded in half, so that a triangular flap part 45 is formed.

The end face part 8 extends along the bottom edge 10, folded in half and interposed between the two panel parts 6 and further between the respective auxiliary gusset parts 12. Therefore, the end face part 8 serves as the bottom gusset part.

The side gusset parts 7 are heat-sealed to the two panel parts 6 along the opposite side edges 9. Furthermore, the end face part 8 is heat-sealed to the auxiliary gusset parts 12 along the opposite side edges 9. Thereby, first sealed sections 13 are formed along the opposite side edges 9. The end face part 8 is heat-sealed to the two panel parts 6 along the bottom edge 10. Thereby, second sealed section 14 is formed along the bottom edge 10. The top edge 11 is an open edge.

The bag 5 can be expanded with the side gussets 7 to increase its capacity. When the bag 5 is expanded, the end face part 8 (bottom gusset part) forms a flat bottom base which allows the bag 5 to stand upright.

As illustrated in FIGS. 1A and 1B, a bag making method includes a step for superposing the first panel web 1 and the second panel web 2 on each other and feeding them. The feed direction $X_1$ is the longitudinal direction of the panel webs 1 and 2. In the implementation, the panel web 1 is the upper panel web, and the panel web 2 is the lower panel web.

A panel web feed device 15 of the bag making apparatus incudes guide rollers 16 and a pair of feed rollers 17 (FIG. 2). The panel webs 1 and 2 are unwound from respective rolls thereof. Alternatively, a wide web (made of such as plastic film) may be unwound from a single roll and slit into the two panel webs 1 and 2. The panel web 1 is guide by the guide rollers 16 to cause the panel webs 1 and 2 to be superposed on each other. FIG. 2 only illustrates one roller of the pair of feed rollers 17. The pair of feed rollers 17 intermittently rotates when driven by a motor, and thereby intermittently feeds the panel webs 1 and 2 in the direction $X_1$. This means that the panel webs 1 and 2 repeat to be fed and paused.

The bag making method further includes a step for, before the superposing of the first and second webs 1 and 2, supplying the side gusset 3 to the panel web 2 to dispose the side gusset 3 in the width direction of the panel webs 1 and 2 such that the side gusset 3 is interposed between the panel webs 1 and 2 when superposing the panel webs 1 and 2.

Figure 4A:
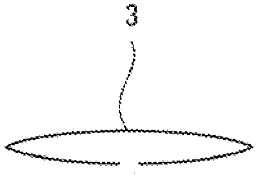
FIG. 4A is a cross sectional view of a side gusset.

The side gusset 3 is folded in halve on the opposite sides with respect to the longitudinal centerline 3*a* thereof. As illustrated in FIG. 4A, the side gusset 3 has a flat cylindrical shape. The side gusset 3 is somewhat wider than twice the width of the side gusset part 7 and somewhat longer than twice the length of the side gusset part 7. As illustrated in FIG. 1A, each of the corner portions of the side gusset 3 on the opposite sides is folded in halves with the angle of 45°, so that triangular flaps 46 are formed on the opposite sides of the side gusset 3.

A side gusset supply device 19 (FIG. 1A) of the bag making apparatus supplies the side gusset 3 to the panel web 2 to dispose the side gusset 3 on the upper surface of the panel web 2 in the width direction of the panel webs 1 and 2. Therefore, the side gusset 3 is interposed between the panel webs 1 and 2 when the panel webs 1 and 2 are superposed on each other by the panel web feed device 15. The side gusset supply device 19 has a well-known configuration.

The bag making method further includes a step for temporarily fixing the side gusset 3 to the panel web 2. A temporary fix device 20 (FIG. 1B) of the bag making apparatus is, for example, an ultrasonic device. The temporary fix device 20 adheres and thus temporarily fixes the side gusset 3 to the panel web 2 by means of ultrasonic sealing to form a temporary sealed section 21 (FIG. 4B) on the longitudinal centerline 3*a* of the side gusset 3 during every intermittent feed cycle of the panel webs 1 and 2. Specifically, the temporary fix device 20 temporarily fixes the side gusset 3 to the panel web 2 while the panel webs 1 and 2 are paused.

The bag making method further includes a step for forming a first line of weakness 22 (FIG. 1A) (which extends in the longitudinal direction of the panel webs 1 and 2) in the panel web 1 before superposing the first and second panel webs 1 and 2 on each other. The bag making method forms perforations 22 as the line of weakness using a disk-shaped perforation cutter 24 (FIG. 1B). The perforations 22 include holes which are successively aligned.

In the implementation, a line-of-weakness forming device 23 (FIG. 1B) of the bag making apparatus includes a perforation cutter 24 disposed upstream of the position where the panel webs 1 and 2 are superposed on each other. The perforation cutter 24 includes a plurality of cutting teeth over the entire circumference thereof, and at least one of the cutting teeth are engaged with the panel web 1. The perforation cutter 24 rotates as the panel web 1 is fed such that the perforations 22 are formed in the panel web 1 by the perforation cutter 24.

Figure 4B:
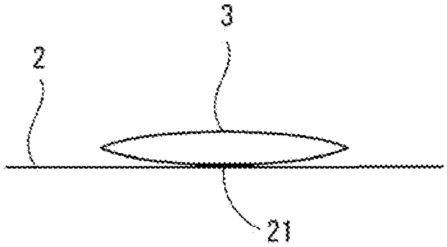
FIG. 4B illustrates temporary fix of the side gusset.
Figure 4C:
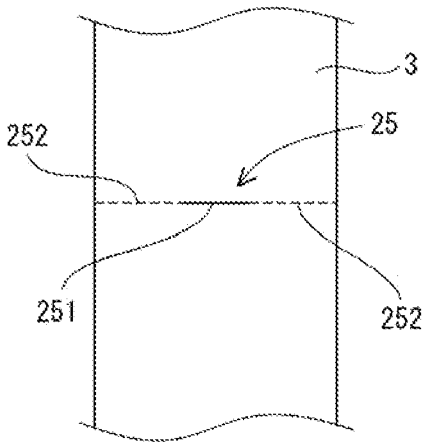
FIG. 4C illustrates perforations of the side gusset.

The bag making method further includes a step for forming a second line of weakness 25 (FIG. 1A) (which extends in the width direction of the side gusset 3) in the side gusset 3 before supplying the side gusset 3 to the panel web 2, and a step for aligning the line of weakness 25 with the line of weakness 22 of the first panel web 1 when superposing the panel webs 1 and 2 on each other. The line of weakness 25 of the implementation is perforations too. As illustrated in FIG. 4C, the perforations 25 include a first slit 251 and a plurality of second slits 252. The first slit 251 is located in the widthwise middle section of the side gusset 3. The second slits 252 are located on the opposite sides with respect to the first slit 251. The length of the first slit 251 in the width direction of the side gusset 3 is longer than the length of each second slit 252 in the width direction of the side gusset 3. This is to facilitate cutting the side gusset 3 open as described below.

Figure 5:
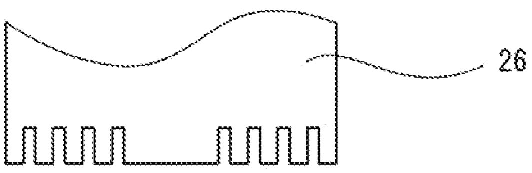
FIG. 5 illustrates a perforation cutter for side gussets.

An additional line-of-weakness forming device 23 of the bag making apparatus includes an additional perforation cutter 26 illustrated in FIG. 5. The perforation cutter 26 has cutting teeth which correspond to the shape of the perforations 25. This device perforates the side gusset 3 using the perforation cutter 26 to form the perforations 25 in the side gusset 3. The side gusset supply device 19 supplies the side gusset 3 with the perforations 25 to the panel web 2. When the panel webs 1 and 2 are superposed on each other by the panel web feed device 15, the perforations 25 are aligned with the perforations 22 of the panel web 1.

The bag making method further includes a step for, after the superposing of the panel webs 1 and 2, sealing one of the two layers of the side gusset 3 to the panel web 1, and the other layer of the side gusset 3 to the panel web 2 to form temporary sealed sections 27 (FIG. 1A). The temporary sealed sections 27 are used for forming open surfaces, which will be described below.

A temporary seal device 28 of the bag making apparatus seals one of the two layers of the side gusset 3 and the panel web 1 to each other, and simultaneously seals the other layer of the side gusset 3 and the panel web 2 to each other during every intermittent feed cycle of the panel webs 1 and 2. Thereby, the pair of temporary sealed sections 27 is formed, one of which is located on one side with respect to the perforations 25 (which have been aligned with the perforations 22) and the other of which is located on the other side with respect to the perforations 25.

As illustrated in FIG. 1A, the bag making method further includes a step for, after the forming of the temporary sealed sections 27, guiding the panel web 1 as the panel webs 1 and 2 are fed, to divide the panel web 1 along its perforations 22 into two and to fold the panel web 1 on the sides of its two division edges 29 along the fold lines 30. The bag making method further includes a step for cutting the side gusset 3 open along its perforations 25 to form two open surfaces 32 by means of this guiding of the panel web 1 and the temporary sealed sections 27.

In order to implement these steps, a first guide device 33 of the bag making apparatus includes guide members such as guide rollers, plates, pinch rollers and so on, as in Patent document 1.

The guide device 33 guides the panel web 1 as the panel webs 1 and 2 are fed such that the panel web 1 is divided along the perforations 22 into two. The division of the panel web 1 results in a pair of division edges 29. The guide device 33 further guides the panel web 1 such that the panel web 1 is folded along a pair of fold lines 30 on the sides of the division edges 29. Thereby, a pair of folded parts 34 is formed from the panel web 1. The fold lines 30 extend in the longitudinal direction of the panel webs 1 and 2.

Each of the temporary sealed sections 27 adheres the upper layer of the side gusset 3 to the panel web 1 and the lower layer of the side gusset 3 to the panel web 2. Therefore, when the panel web 1 is folded (lifted), the upper layer of the side gusset 3 is pulled up by the temporary sealed sections 27. This pulling up causes the side gusset 3 to be cut open along its perforations 25 so as to be divided into two. This cutting open results in a pair of incision edges 31. The side gusset 3 is further opened on the sides of the pair of incision edges 31 to form a pair of substantially rhombus-shaped open surfaces 32.

The bag making method further includes a step for supplying the end face web 4 to the panel web 1 as the panel webs land 2 are fed, to dispose the end face web 4 in the longitudinal direction of the panel webs 1 and 2 so as to superpose the end face web 4 on the pair of folded parts 34 and the pair of open surfaces 32. The end face web 4 is somewhat wider than twice the width of the end face part 8 of the bag 5.

An end face web supply device 35 of the bag making apparatus includes guide rollers 36. The end face web 4 is unwound from a roll. As the panel webs 1 and 2 are fed, the end face web 4 is guided by the guide rollers 36 and supplied to the panel web 1 to be disposed in the width direction of the panel webs 1 and 2 such that the end face web 4 is superposed on the pair of folded parts 34 and the pair of open surfaces 32. As in JP6381169B1, a wide web (e.g., made of plastic film) may be unwound from a roll thereof and divided in its longitudinal direction into the end face web 4 and the panel web 1 or 2.

Figure 4D:
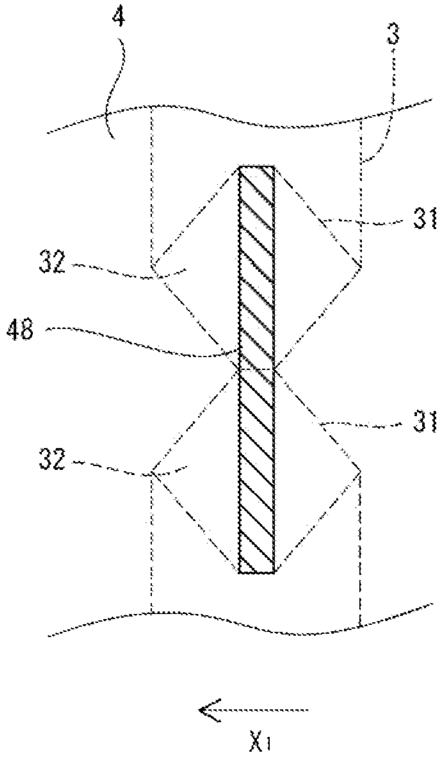
FIG. 4D illustrates forming of an auxiliary sealed section.

The bag making method further includes a step for, after the supply of the end face web 4, sealing the side gusset 3 to the panel webs 1 and 2 and the end face web 4 in the width direction of the panel webs 1 and 2 to form the auxiliary sealed section 48 (illustrated only in FIG. 4D) at least along the diagonal line of each open surface 32. An open surface seal device 37 of the bag making apparatus heat-seals the side gusset 3 to the panel webs 1 and 2 and the end face web 4 in the width direction of the panel webs 1 and 2 along the diagonal lines of the pair of respective open surfaces 32 during every intermittent feed cycle of the panel webs 1 and 2. Thereby, the auxiliary sealed section 48 is formed. The end face web 4 is adhered to the pair of open surfaces 32 due to the auxiliary sealed section 38. The open surface seal device 37 may form the auxiliary sealed section 48, for example using heat seal bars.

The bag making method further includes a step for, after the forming of the auxiliary sealed section 48, guiding the panel web 1 as the panel webs 1 and 2 are fed, to fold the panel web 1 back along the fold lines 30, and during this, folding back of the panel web 1 causes the open surfaces 32 to be closed so as to form the auxiliary gussets 18 and also causes the end face web 4 to be folded in halves.

A second guide device 38 of the bag making apparatus includes guide members such as guide rollers, plates, pinch rollers and so on.

The guide device 38 guides the panel web 1 as the panel webs 1 and 2 are fed such that the panel web 1 is folded back along the pair of fold lines 30. This folding back of the panel web 1 causes the pair of open surfaces 32 to be closed, so that two auxiliary gussets 18 are formed from the open surfaces 32. Furthermore, the folding back of the panel web 1 causes the end face web 4 to be folded in halve on the opposite sides with respect to the longitudinal centerline thereof (which is parallel to the longitudinal direction of the panel webs 1 and 2). As a result, the end face web 4 which has been folded in halve is interposed between the panel webs 1 and 2 and also between the respective auxiliary gussets 18 formed from the opening surfaces 32. In addition, the pair of division edges 29 is aligned with each other.

As illustrated in FIG. 2, the bag making method further includes a step for, after the folding back of the panel web 1, heat-sealing the end face web 4 to the panel webs 1 and 2 along the division edges 29 in the longitudinal direction of the panel webs 1 and 2 to form a longitudinal sealed section 39 along the division edges 29. A longitudinal seal device 40 of the bag making apparatus includes a pair of heat seal bars, and performs heat-sealing using the heat seal bars to form the longitudinal sealed section 39 during every intermittent feed cycle of the panel webs 1 and 2.

The bag making method further includes a step for, after the supply of the end face web 4, heat-sealing the side gusset 3 to the panel webs 1 and 2 and the end face web 4 in the width direction of the panel webs 1 and 2 to form a cross sealed section 41 at least over the entire length of the side gusset 3 (preferably over the entire width of the panel webs 1 and 2). In the implementation, the cross heat-sealing is performed after the folding back of the panel web 1. The position of this heat-sealing is the position of the longitudinal centerline 3*a* of the side gusset 3. Therefore, the cross sealed section 41 extends along the centerline 3*a*. Since the end face web 4 is interposed between the respective auxiliary gussets 18 of the side gusset 3, the end face web 4 is sealed to the side gusset 3 in the position of the auxiliary gussets 18. A cross seal device 42 of the bag making apparatus in the implementation includes two pairs of heat seal bars, and performs heat-sealing using the heat seal bars to form the cross sealed section 41 during every intermittent feed cycle of the panel webs 1 and 2. The aforementioned auxiliary sealed section 48 is included in the cross sealed section 41 and thus integrated with the cross sealed section 41.

The bag making method further includes a step for slitting the panel webs 1 and 2, the side gusset 3 and the end face web 4 in the longitudinal direction of the panel webs 1 and 2 as the panel webs 1 and 2 is fed. The position of this slitting is the position of the pair of division edges 29 which has been aligned with each other, and thus in the implementation is the position of the longitudinal sealed section 39. As a result, the panel web 2 and the end face web 4 are also divided, respectively.

As in Patent document 1, a slit device 43 of the bag making apparatus includes a pair of slitters spaced apart from one another in the width direction of the panel webs 1 and 2. As the panel webs 1 and 2 are fed, the panel webs 1 and 2, the side gusset 3 and the end face web 4 are slit along the division edges 29 by the slitters. Although a margin is generated between the slitters, it is wound up by a well-known winder as in Patent document 1 and is separated as a waste from the panel webs 1 and 2.

The bag making method further includes a step for, after the slitting, cross-cutting the panel webs 1 and 2, the side gusset 3 and the end face web 4 in the width direction of the panel webs 1 and 2 and thereby making the bags 5. The position of the cross-cutting is the position of the cross sealed section 41.

A cross cut device 44 of the bag making apparatus further includes a cutter. The cross cut device 44 cross-cuts the panel webs 1 and 2, the side gusset 3 and the end face web 4 in the width direction of the panel webs 1 and 2 in the position of the cross sealed section 41 using the cutter during every intermittent feed cycle of the panel webs 1 and 2. Thereby, two bags 5 are made every cross-cutting in the implementation.

Thus, the panel parts 6 of the bag 5 are formed from the panel webs 1 and 2. Each side gusset part 7 is formed from the side gusset 3. The end face part 8 is formed from the end face web 4. Specifically, each auxiliary gusset part 12 is formed from the auxiliary gusset 18. The second sealed section 14 is formed from the longitudinal sealed section 39. Each first sealed section 13 is formed from the cross sealed section 41. Each triangular frap part 45 is formed from the triangular flap 46.

The facing surfaces of the panel webs 1 and 2 facing each other are made of sealant such as polyethylene or polypropylene, whereas their opposite surfaces are made of base material such as nylon or PET. The outer surface of the side gusset 3 which has been folded in halve is made of the sealant, whereas its inner surface is made of the base material. The facing surface of the end face web 4 facing the panel webs 1 and 2 is made of the sealant, while its opposite surface is made of the base material. Heat-sealing the films to each other is achieved due to the sealant. These are the same those disclosed in Patent documents 1 and 2.

The bag making method may further include a step for filling the bag 5 with contents through the top edge 11 (open edge) and a step for heat-sealing the two panel parts 6 to each other along the top edge 11 after the step for filling.

Other implementations will be described below. The same or similar components in the previous implementation are indicated by the same numerals, and their explanations are omitted. The description of the steps that are identical or similar to those in the previous implementation are omitted.

Figure 6:
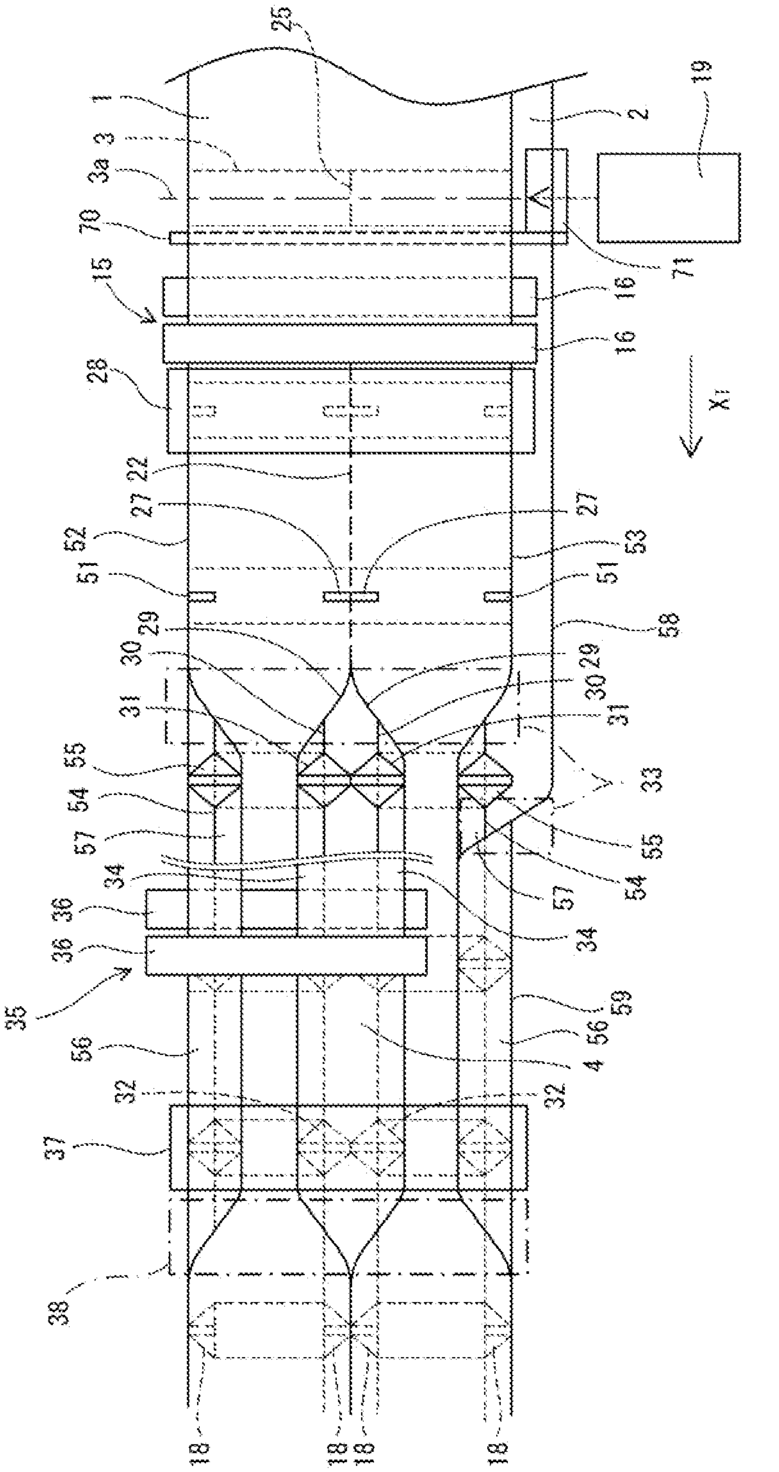
FIG. 6 is a schematic plan view of an upstream section of a bag making apparatus according to another implementation.
Figure 7:
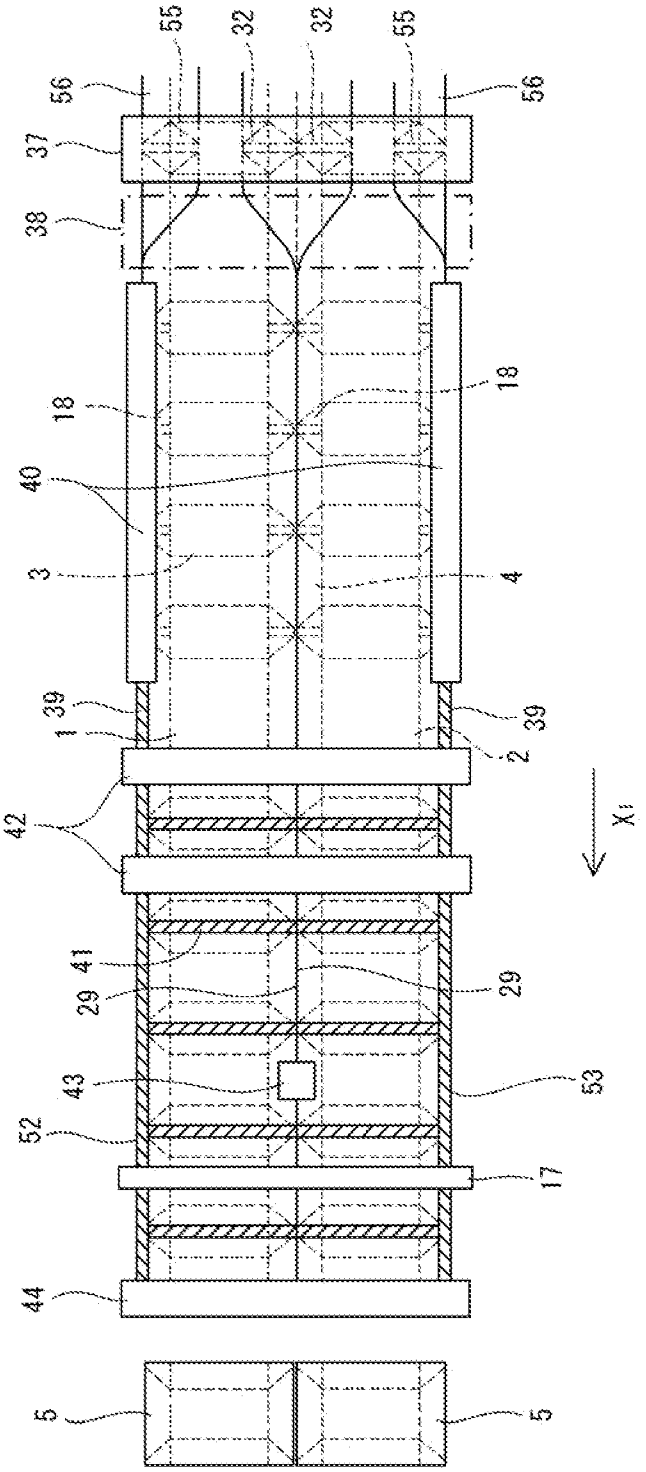
FIG. 7 is a schematic plan view of a downstream section of the bag making apparatus in FIG. 6.
Figure 8A:
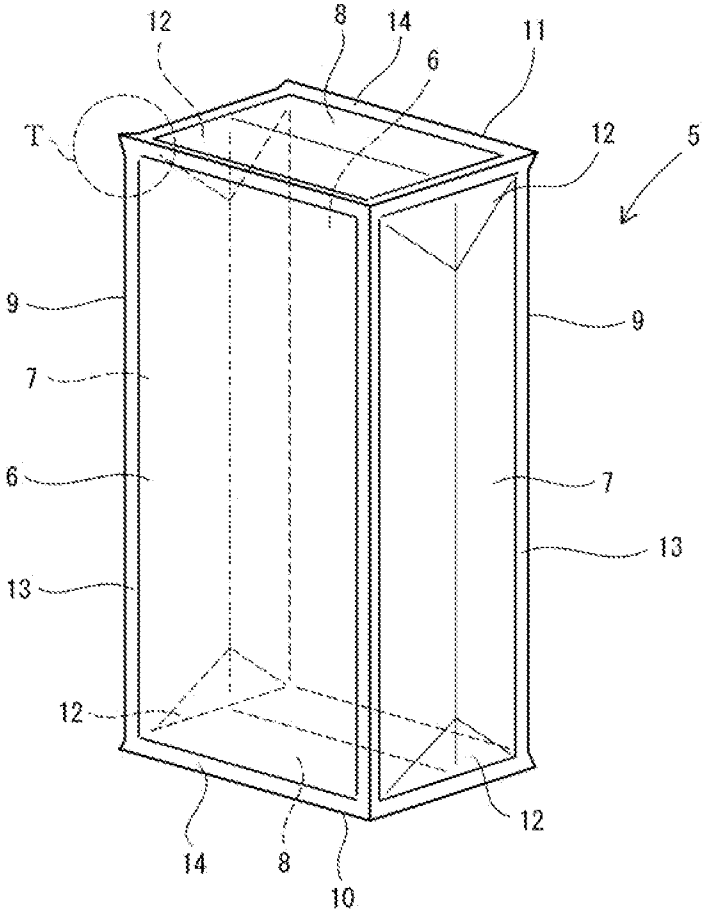
FIG. 8A illustrates another bag.

The bag making method of the implementation illustrated in FIG. 6 and FIG. 7 makes the bags 5 illustrated in FIG. 8A. The auxiliary gusset parts 12 of the bag 5 are formed at the opposite ends of each side gusset part 7. In addition, two end face parts 8 are provided, one of which serves as a bottom part (which may be a bottom gusset part) and the other of which serves as a top part (which may be a top gusset part).

Figure 9A:
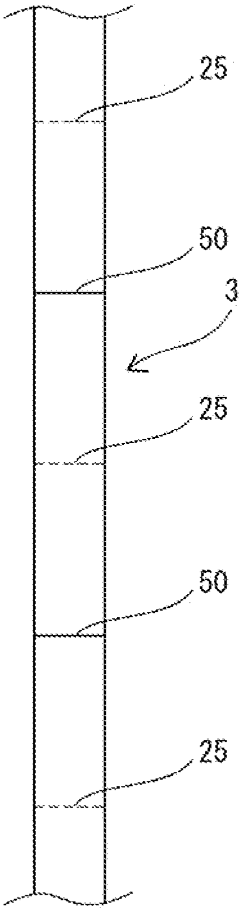
FIG. 9A illustrates a side gusset web.

As illustrated in FIG. 6, a side gusset 3 with no triangular flaps 46 (FIG. 1A) formed at the opposite ends of the side gusset 3 is fed to the panel web 2. For example, the side gusset feed device 19 supplies a side gusset web 3 as illustrated in FIG. 9A to the panel web 2 to dispose it in the width direction of the panel webs 1 and 2, and then cuts the side gusset web 3 in a predetermined cutting position 50, for example by means of shearing, to locate one piece side gusset 3 on the panel web 2. The lines of the perforations 25 as the second lines of weakness have been formed in advance in the side gusset web 3 by the perforation cutter 26 (FIG. 5) at the predetermined intervals.

The temporary seal device 28 seals the side gusset 3 to the panel webs 1 and 2 not only on the opposite sides with respect to the perforations 25 but also on the opposite ends of the side gusset 3 to form temporary sealed sections 51 in addition to the temporary sealed sections 27.

The first guide device 33 guides the panel web 1 as the panel webs 1 and 2 are fed, such that the panel web 1 is folded on the sides of the side edges 52 and 53 thereof along additional fold lines 54. The side gusset 3 is then opened by means of this folding of the panel web 1 and the temporary sealed sections 51 such that two open surfaces 55 are formed in addition to the open surfaces 32. The fold lines 54 extend in the longitudinal direction of the panel webs 1 and 2.

On the side of the side edge 52, the end face web supply device 35 supplies an additional end face web 56 as the panel webs 1 and 2 are fed to dispose this web 56 in the longitudinal direction of the panel webs 1 and 2 so as to superpose the additional folded parts 57 of the panel web 1 and the open surfaces 55.

The panel web 2 of the implementation is wider than the panel web 1 and protrudes by a certain distance from the side edge 53. The guide device 33 guides the panel web 2 such that the panel web 2 is folded on the side of the side edge 58 corresponding to the side edge 53 along a further additional fold line 59. This folded part of the panel web 2 serves as a further additional end face web 56 and is superposed on the open surfaces 55 and the folded part 57 of the panel web 1 near the side edge 53. The fold line 59 extends in the longitudinal direction of the panel webs 1 and 2. This is the same as that in Patent document 2.

The open surface seal device 37 not only seals and thus adheres the end face web 4 to the open surfaces 32, but also seals and thus adheres the respective end face webs 56 to the open surfaces 55 on which they are superposed.

The second guide device 38 guides the panel web 1 as the panel webs 1 and 2 are fed, such that the panel web 1 is folded back along the two fold lines 54. This folding back of the panel web 1 causes the end face webs 56 to be folded in halve. In addition, this folding back of the panel web 1 causes the open surfaces 55 to be closed, so that the auxiliary gussets 18 are also formed at the opposite ends of the side gusset 3.

As in the side edge 53, on the side of the side edge 52, the panel web 2 may be folded in order to supply this folded part as the end face web 56. As in the side edge 52, on the side of the side edge 53, the end face web 56 which is separated from the panel web 2 may be supplied by the end face web supply device 35.

As illustrated in FIG. 7, the longitudinal seal device 40 does not heal-seal the end face web 4 along the pair of division edges 29. The longitudinal seal device 40 includes two pairs of heat seal bars, and heat-seals the additional end face webs 56 in the longitudinal direction of the panel webs 1 and 2 along the opposite side edges 52 and 53 to form the longitudinal sealed sections 39 during every intermittent feed cycle of the panel webs 1 and 2.

The cross seal device 42 heat-seals the side gusset 3 to the panel webs 1 and 2 and the end face webs 4 and 56 in the width direction of the panel webs 1 and 2 to form the cross sealed section 41 during every intermittent feed cycle of the panel webs 1 and 2.

As in the previous implementation, the slit device 43 slits the panel webs 1 and 2, the side gusset 3 and the end face web 4 along the pair of division edges 29 using the pair of slitters, and separates the margin (generated during this slitting) as wasted from the panel webs 1 and 2 using a winder.

The cross cut device 44 cross-cuts the panel webs 1 and 2, the side gusset 3 and the end face webs 4 and 56 in the position of the cross sealed section 41 in the width direction of the panel webs 1 and 2 using a cutter during every intermittent feed cycle of the panel webs 1 and 2, thereby making the bags 5. Two end face parts 8 are formed from the end face webs 4 and 56, wherein the end face web 4 becomes the bottom/top part and the end face web 56 becomes the top/bottom part. Since the end face part 8 formed from the end face web 4 has not been heat-sealed to the panel parts 6, either the bottom edge 10 or the top edge 11 serves as the open edge. When heat-sealing the open surfaces 32 and 55 using the longitudinal seal device 40, it is possible to select which edge is the open edge depending on whether this heat-sealing is performed with the open surface open or closed.

In a subsequent step, the contents may be filled with the bag 5 through the open edge, and then the end face part 8 formed from the end face web 4 and the panel web 1 may be heat sealed to each other along said open edge to form an additional second sealed section 14. FIG. 8A illustrates the bag 5 with the additional second sealed selection 14 which has been already formed.

Figure 10A:
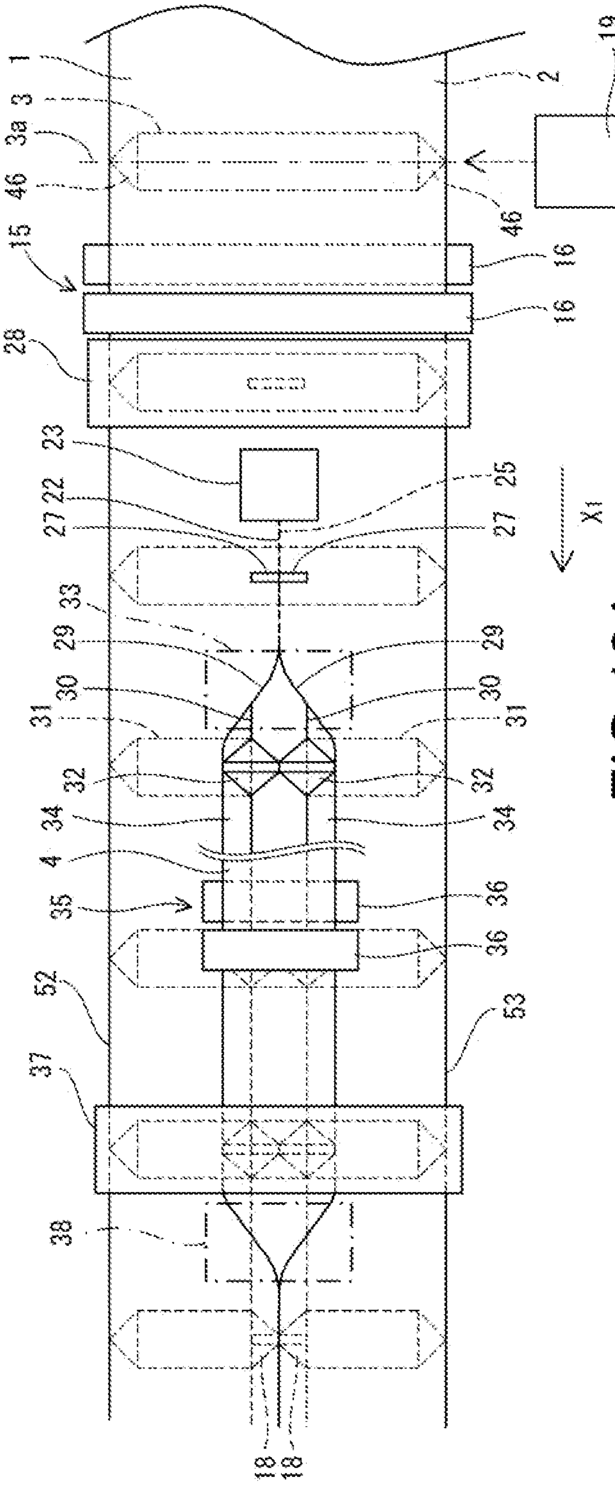
FIG. 10A is a schematic plan view of an upstream section of a bag making apparatus according to yet another implementation.
Figure 10B:
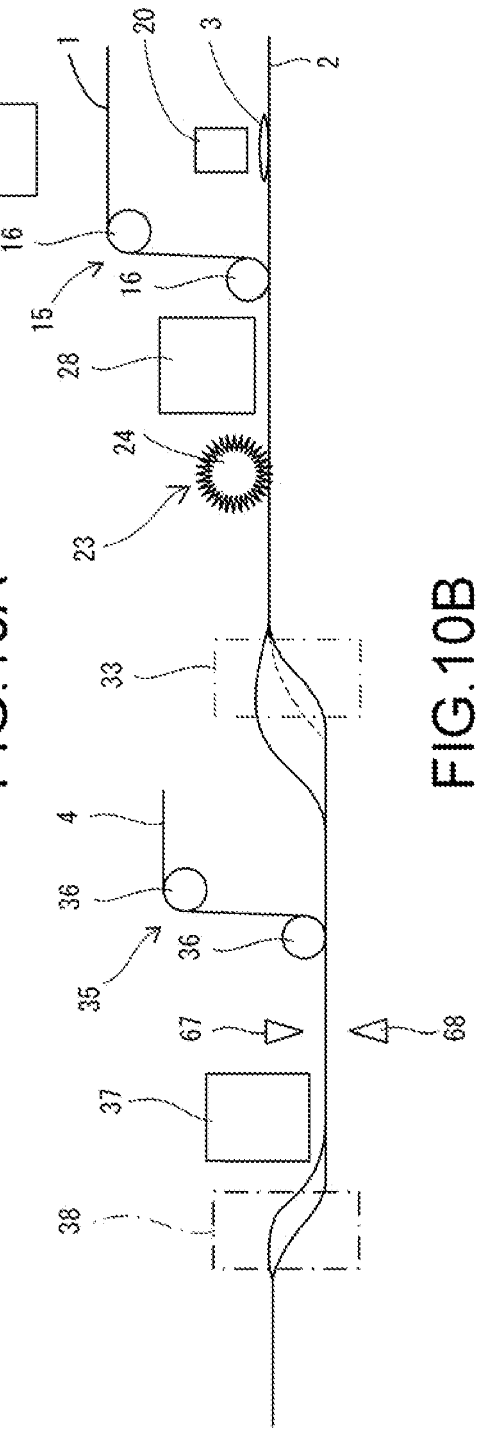
FIG. 10B is a schematic side view of FIG. 10A.

As illustrated in the implementation of FIGS. 10A and 10B, the bag making method may further include a step for forming the perforations 22 as the first line of weakness and the perforations 25 as the second line of weakness using the perforation cutter 24 after superposing the panel webs 1 and 2 on each other. This ensures that the perforations 22 and 25 are aligned with each other, and consequently, allows accurate forming of the open surfaces 32.

The line-of-weakness forming device 23 is disposed downstream of the position where the panel web feed device 15 superposes the panel webs 1 and 2 on each other. That is, in the implementation, the perforation cutter 24 is disposed downstream of the feed rollers 16 which guide the panel web 1 to superpose it on the panel web 2. As the panel webs 1 and 2 are fed, the perforation cutter 24 rotates such that the perforations 22 are formed in the panel web 1. When the side gusset 3 interposed between the panel webs 1 and 2 passes through the perforation cutter 24, the perforations 25 are formed in the side gusset 3 by the perforation cutter 24. The position of the perforations 25 is between the pair of temporary sealed sections 27.

The line-of-weakness forming device 23 (perforation cutter 24) is preferably disposed downstream of the temporary seal device 28. This is because, after the forming of the temporary sealed sections 27, the temporary sealed sections 27 prevent the relative displacement of the side gusset 3 and the panel web 1, and as a result, the formed perforations 22 and 25 are surely prevented from being displaced relative to each other.

Figure 11A:
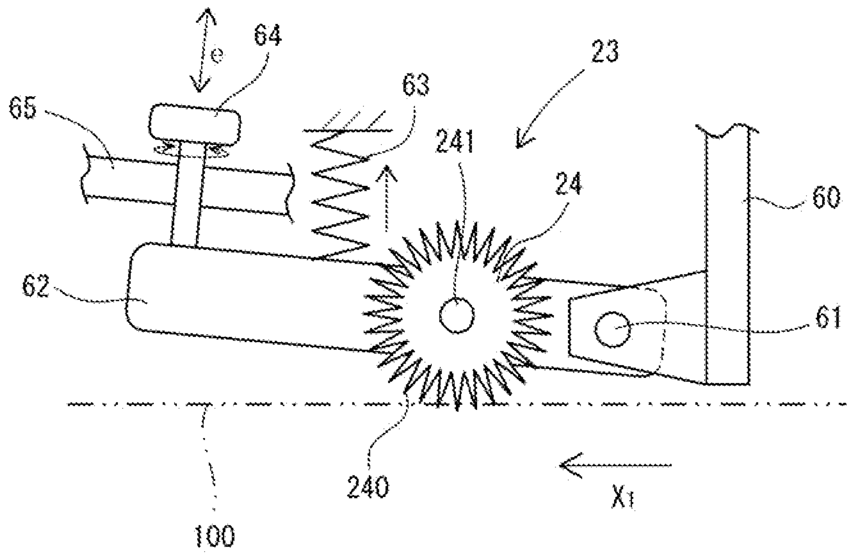
FIG. 11A is a schematic side view of a line-of-weakness forming device.

FIG. 11A illustrates the line-of-weakness forming device 23 of this implementation. The device 23 includes an arm 62 supported at one end thereof by a frame 60 via a pivot shaft 61 (extending in the width direction of the panel webs 1 and 2) to be pivotable around the pivot shaft 61. The disk-shaped perforation cutter 24 is supported by the arm 62 via a bearing or the like to be rotatable around its rotation shaft 241 extending in the width direction of the panel webs 1 and 2. The perforation cutter 24 has a plurality of cutting teeth 240 over its entire circumference and is supported by the arm 62 such that some of the cutting teeth 240 enter the feed plane 100 where the panel webs 1 and 2 are fed by the panel web feed device 15.

The device 23 further includes a biasing member 63 that biases the arm 62 in a direction (clockwise) in which the perforation cutter 24 is away from the feed plane 100, and an adjustment member 64 that contacts the arm 62 to prevent the arm 62 from being moved around the pivot shaft 61 by the biasing member 63. In the implementation, the biasing member 63 is a spring, and the adjustment member 64 is an adjustment knob. The adjustment member 64 is rotatably supported around its axis by a support member 65 which is fixed to the frame 60. The adjustment member 64 is coupled to the support member 65 via a screw engagement. The adjustment member 64, when rotated, moves with respect to the support member 65 in a direction (c) toward or away from the arm 62, thereby fine-tuning the cutting depth of the perforation cutter 24 (the amount of entry of the perforation cutter 24 into the feed plane 100). This allows the cutting depth to be set appropriately in accordance with the characteristics such as material, thickness, and structure of the panel webs 1 and 2 and the side gusset 3. The adjustment member 64 is not limited to a rotary type such as a knob, but may be any other member such as a cam.

Figure 11B:
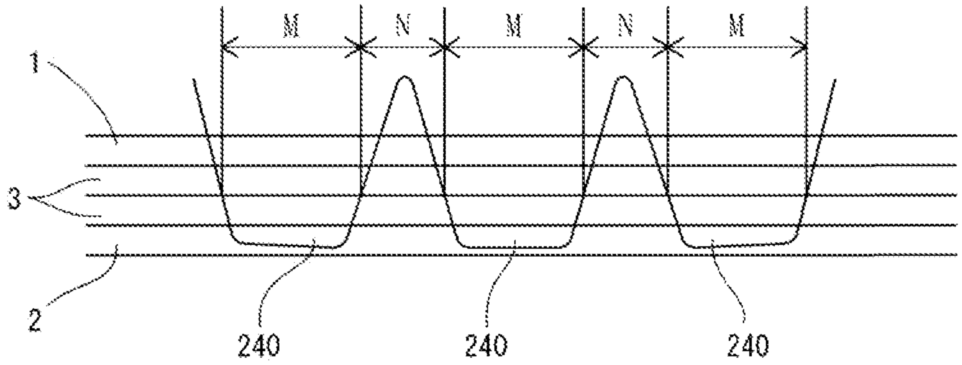
FIG. 11B is a cross sectional view for illustration of forming of perforations.

FIG. 11B illustrates that the perforations 25 are being formed in the side gusset 3 by the perforation cutter 24. Each zone M are a zone where the side gusset 3 is being cut by the cutting tooth 240, and each zone N is a zone where the side gusset 3 is not cut by the cutting tooth 240. The larger the ratio M/N is, the higher the case of cutting (weakness) of the perforations 22 and 25 is. When forming the perforations 22 and 25 in the panel web 1 and the side gusset 3, the perforations need not be formed in the panel web 2. Therefore, the cutting teeth 240 do not have to penetrate through the panel web 2, as illustrated in FIG. 11B.

However, the cutting depth is preferably adjusted using the above adjustment knob 64 such that perforations are not formed in the panel web 2. This is because, when the open surfaces 32 are formed by means of the guiding of the panel web 1, the panel web 2 may be torn along said perforations to cause misalignment, which may adversely affect the forming of the open surfaces 32 and the subsequent steps.

Figure 12:
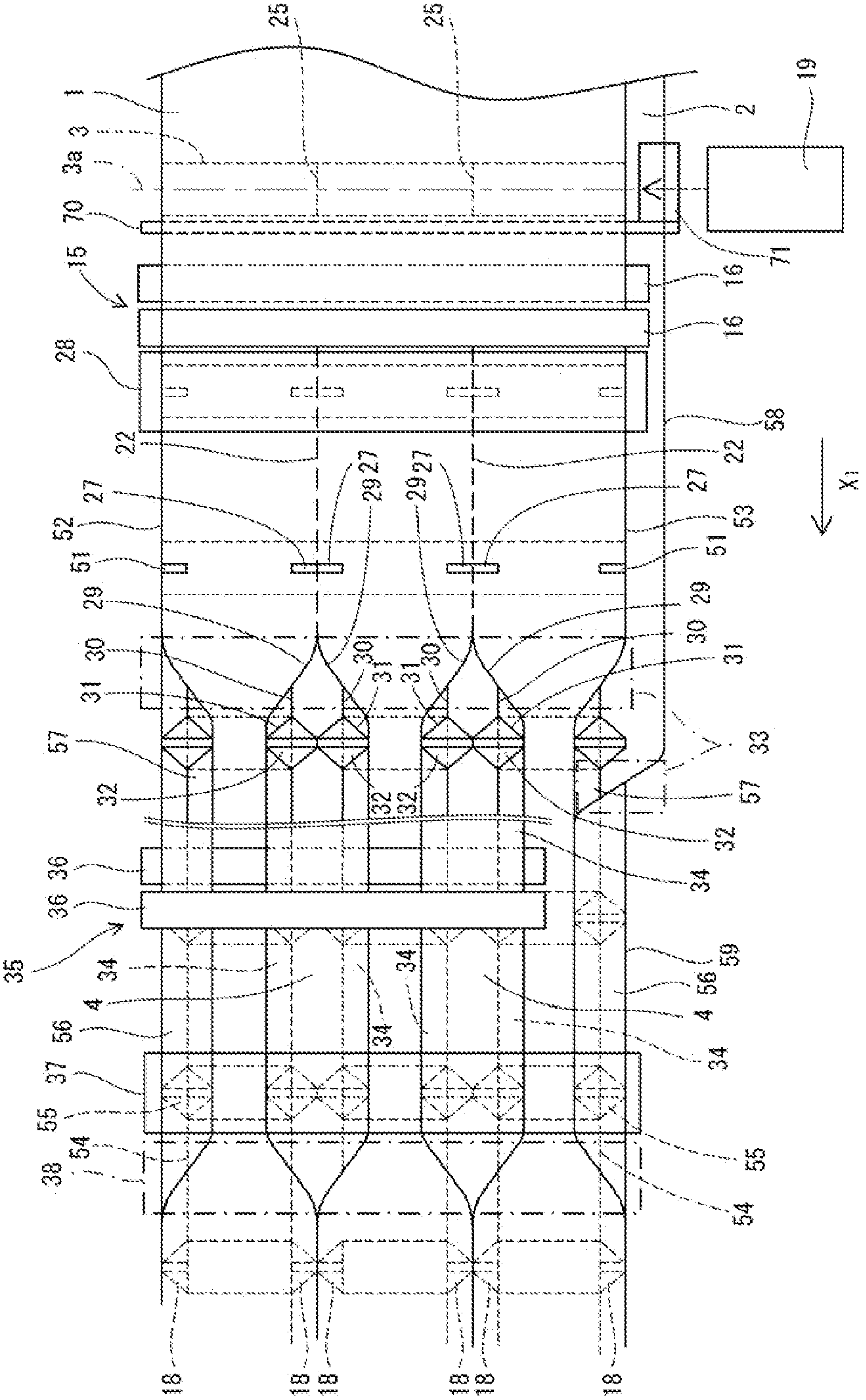
FIG. 12 is a schematic view of an upstream section of a bag making apparatus according to yet another implementation.

The implementation of FIG. 12 discloses three-line bag making. Two lines of perforations 22 as two first lines of weakness are formed in the panel web 1 to be spaced from one another in the width direction the first panel web 1. Two lines of perforations 25 as two second lines of weakness are formed in the side gusset 3 to be spaced from one another in the longitudinal direction of the side gusset 3. The bag making method guides the panel web 1 using the first guide device 33 to divide the panel web 1 along the two lines of perforations 22 into three and to fold the panel web 1 on the sides of the two pairs of division edges 29 along the fold lines 30. The bag making method cuts the side gusset 3 open along the two lines of perforations 25 (that each aligns with the perforations 22) by means of this folding of the panel web 1 and the temporary sealed sections 27, to form two pairs of open surfaces 32.

The bag making method feeds the two end face webs 4 using the end face supply web device 35 as the panel webs 1 and 2 are fed, to dispose the end face webs 4 in the longitudinal direction of the panel webs 1 and 2, so as to superpose one end face web 4 on one pair of folded parts 34 and one pair of open surfaces 32, and the other end face web 4 on the other pair of folded parts 34 and the other pair of open surfaces 32. The bag making method guides the panel web 1 using the second guide device 38 to fold the panel web 1 back along the respective fold lines 30, and this folding back causes the respective end face webs 4 to be folded in halves on the opposite sides with respect to the longitudinal centerline thereof and also causes the respective open surfaces 32 to be closed so as to form four auxiliary gussets 18.

The opposite ends of the side gusset 3 and the opposite side edges 52 and 53 of the panel web 1 may be processed as desired in accordance with the design of the bags 5 to be made, not necessarily as illustrated in FIG. 12.

The subsequent steps are substantially the same as those in the previous implementations and therefore omitted. It is optional which edge is used as the open edge of the bags 5 by forming the longitudinal sealed section 39 (FIG. 2, FIG. 6) along any of the division edges 29 and the edges 52 and 53.

It should be easily appreciated by those skilled in the art from the above implementations that multi-line bag making with four or more lines is also possible.

As can be seen from the above, multi-line bag making in each implementation eliminates the need for suppling the side gussets to the panel web at several times and disposing these side gussets in a single line in the width direction of the panel webs. This reduces the time required for the supply of the side gusset and improves the production efficiency of bags each with an end face part.

If a single side gusset 3 is used in multi-line bag making, there will be a problem with the forming of the open surfaces 32 at the division edges 29 of the panel web 1. However, the implementations solve this problem by cutting the side gusset 3 open along the second line of weakness 25 by means of the guiding of the panel web 1 to form the open surfaces 32. The panel web 1 and the side gusset 3 are prevent from being torn along the first and second lines of weakness 22 and 25 until the panel web 1 is guided by the first guide device 33. This facilitates and ensures the forming of the open surfaces 32. As a result, the made bags 5 are better finished.

After the forming of the open surfaces 32, the end face web 4 is fed to the panel web 1 to be superposed on the open surfaces 32 of the side gusset 3. In two-line bag making method of Patent document 1, the end face web (bottom gusset web) is disposed on the upper surface of the upper panel web before the open surfaces are formed. In this case, the end face web acts as a resistance during the forming of the open surfaces and can interfere with the forming of the open surfaces. The present implementations also solve this problem of Patent document 1.

In the above implementations, the first and second lines of weakness 22 and 25 are not limited to perforations, but may be, for example, a plurality of micro-joints formed at appropriate intervals, or concave lines which have a thinner material thickness than the surrounding area and are thereby easier to be torn.

Variations and additional configurations will be further described.

When patterns are printed on the panel webs 1 and 2 and the end face web 4, it may be necessary to align these patterns. The bag making apparatus may further include first and second sensors 67 and 68 used for the alignment of the end face web 4 and the panel web 2 in the feed direction $X_1$, as illustrated in FIG. 1B and FIG. 10B. Marks are printed on the upper surface of the end face web 4 and the lower surface of the panel web 2 in accordance with the pitch of the intermittent feed of the panel webs 1 and 2, respectively. The first sensor 67 detects the marks of the end face web 4, and the second sensor 68 detects the marks of the panel web 2.

For example, the case where the sensor 67 does not detect the mark of the end face web 4 at the timing when the sensor 68 detects the mark of the panel web 2 means that the supply of the end face web 4 is delayed. Therefore, in this case, the upstream tension of the end face web 4 is made lowered. In contrast, the sensor 67 has already detected the mark of the end face web 4 at the timing when the sensor 68 detects the mark of the panel web 2 means that the supply of the end face web 4 is early. Therefore, in this case, the upstream tension of the end face web 4 is made increased. Repeating this causes the patterns of the end face web 4 and the panel web 2 to be aligned in the feed direction $X_1$.

The tension range and the detection range of the sensors 67 and 68 may be changed as appropriate depending on for example the size of the bags to be made and the feed speed. Since the marks of the end face web 4 and the marks of the panel web 2 are not necessarily printed on the same positions, the sensors 67 and 68 may be supported to be movable in the feed direction $X_1$.

The way of cutting the side gusset web 3 is not limited to shearing. For example, perforations may be formed in the cutting position 50 of FIG. 9A, and the side gusset feed device 19 grips the side gusset web 3 on the opposite sides with respect to the perforations using two clamps. Then, at least one of the clamps may be moved away from the other clamp to tear off the side gusset web 3 along the perforations.

Figure 9B:
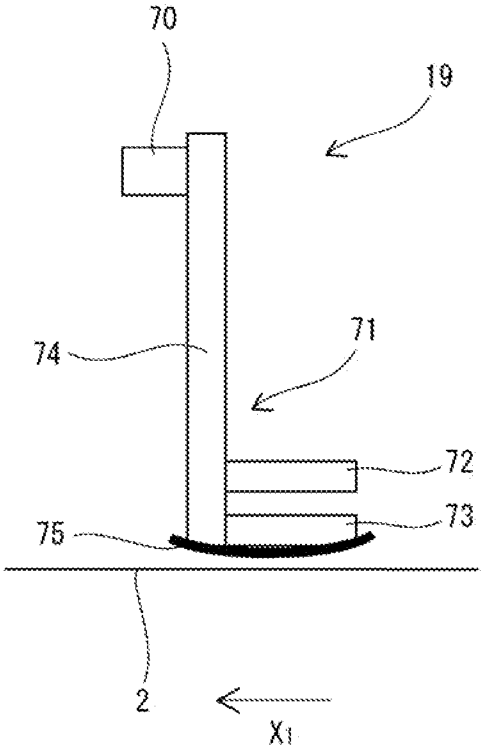
FIG. 9B is a side view of a transport unit that conveys the side gusset web.

As illustrated in FIG. 6 and FIG. 12, the side gusset supply device 19 may include a guide 70 extending in the width direction of the panel webs 1 and 2, and a transport unit 71 disposed to be movable along the guide 70. FIG. 9B is a view of the transport unit 71 viewed from one side of the width direction of the panel webs 1 and 2. The transport unit 71 includes two claws 72 and 73, and a slider 74 that holds these claws 72 and 73 and is movable along the guide 70.

The transport device 71 releasably grasps the side gusset web 3 of FIG. 9A using the claws 72 and 73 by moving the upper claw 72 towards and away from the lower claw 73. The transport unit 71 transports and disposes the side gusset web 3 on the panel web 2 by moving the side gusset web 3 along the guide 70 while grasping the side gusset 3 using the claws 72 and 73. When the transport of the side gusset web 3 is completed, the temporary fix device 20 temporarily fixes the side gusset web 3 to the panel web 2 to form the temporary fixed section 21 (FIG. 4B).

As the claws 72 and 73 grasp the side gusset web 3 and transport it on the panel web 2, tension may be applied from the upstream side of the side gusset web 3. This prevents displacement of the side gusset web 3 during the supply of the side gusset web 3, and thus allows it to be disposed in an accurate position. Thereafter, the transport unit 71 returns to the stand-by position.

The transport unit 71 moves in the width direction of the panel webs 1 and 2 with respect to the panel web 2 and the side gusset 3, and the panel web 2 and the side gusset 3 move in the feed direction $X_1$ with respect to the transport unit 71. Therefore, the transport unit 71 may preferably have a downwardly convex, spherical crown-shape curved surface 75 at its lower end. This prevents the transport unit 71 from snagging on or damaging the panel web 2 or the side gusset 3.

For example, with regard to the timing of the feed of the panel webs 1 and 2 and the supply of the side gusset 3, the start of the feed of the panel webs, the stop of the feed of the panel webs, the supply of the side gusset, the temporary fix and the restart of the feed of the panel webs may be repeated. Also, the start of the feed of the panel webs, the supply of the side gusset, the stop of the feed of the panel webs, the temporary fix and the restart of the feed of the panel webs may be repeated. The latter is advantageous in terms of high-speed bag making.

Figure 8B:
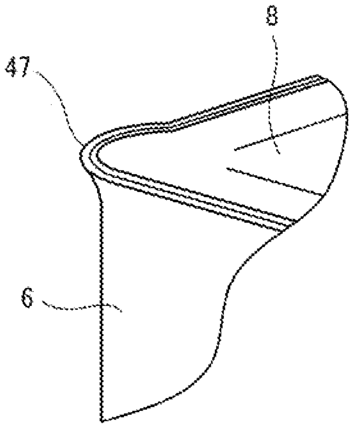
FIG. 8B is an enlarged perspective view of a region T in FIG. 8A.
Figure 8C:
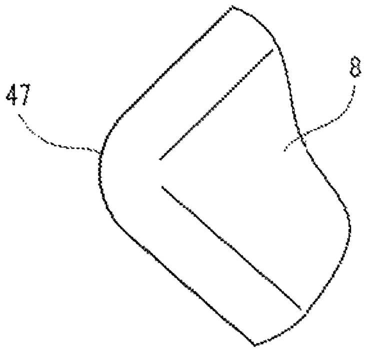
FIG. 8C is an enlarged plan view of the region T.

The bag making method may further include punching the panel webs 1 and 2, the side gusset 3 and the end face web 4 (or 56) using a punch blade, Thomson blade, etc. (see, for example, FIG. 14), such that each of the bags 5 has round corner cut portions 47 to prevent injury, as illustrated in FIGS. 8B and 8C. This step is well known.

Figure 13:
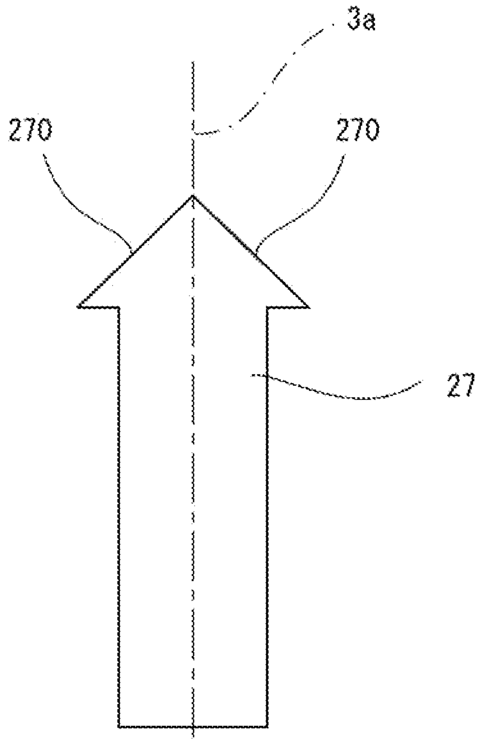
FIG. 13 illustrates a temporary sealed section.

The temporary sealed sections 27 (or 51) contribute to the forming of the open surfaces 32 (or 55) as described above. As illustrated in FIG. 13, the temporary sealed section 27, for example, may have a triangular shape, the tip portion of which includes two slant lines 270 and narrows toward the tip. Since creases are formed along the two slant lines 270 when the open surfaces 32 are formed, the resulting open surfaces 32 have clean finish. The slant lines of the auxiliary gusset part 12 of the bag 5 in FIG. 8A are the creases formed along the slant lines 270.

Figure 14A:
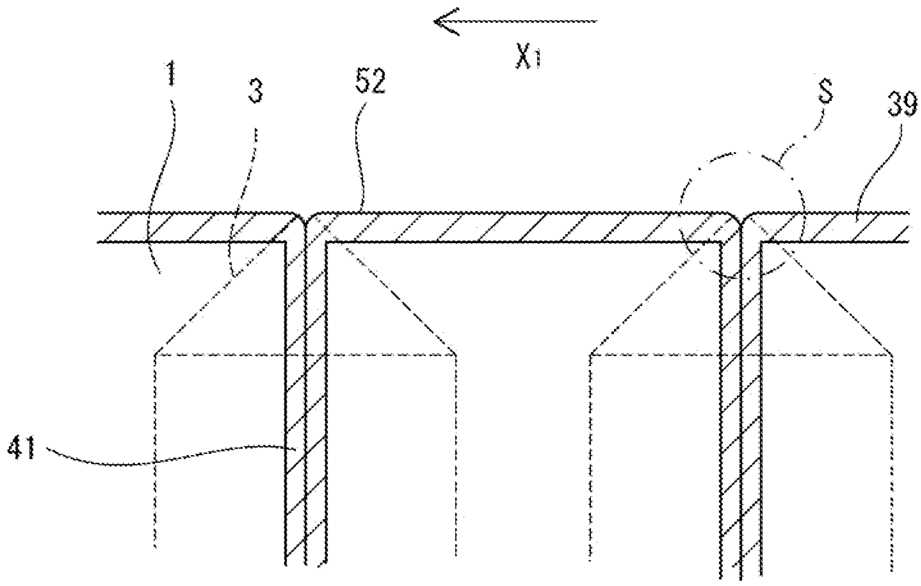
FIG. 14A illustrates a step for corner-cutting.
Figure 14B:
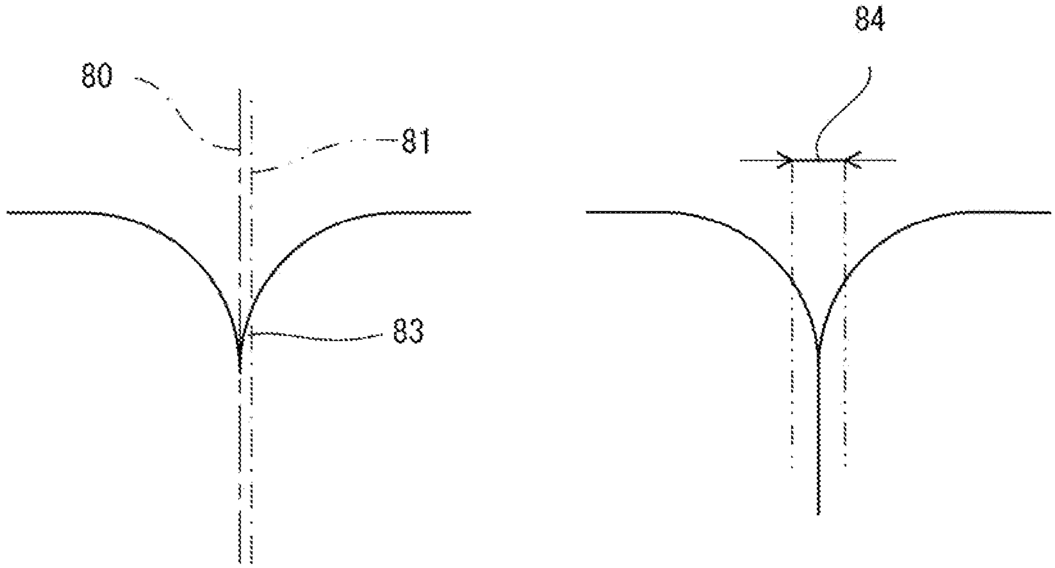
FIG. 14B is an enlarged view of a region S in FIG. 14A.

FIG. 14A illustrates a step for corner cutting, and FIG. 14B illustrates an enlarged view of the region S in FIG. 13A including the corner cut portion. As illustrated in FIG. 14B, even if the position 81 of the cross cutting is shifted slightly in the feed direction $X_1$ from the boundary line 80 between two bags which are adjacent to each other in the feed direction $X_1$, a sharp protrusion 83 that may cause injury is generated in one of the bags. Therefore, in cross-cutting by the cross cut device 44, a margin 84 extending in the width direction of the panel webs 1 and 2 should be generated and discarded as waste in order to prevent the generation of the protrusion 83 on the bag. The margin between two bags which are adjacent to each other in the width direction of the panel webs 1 and 2 is generated during the slitting by the slit device 43 and discarded as waste, as described above.

Figure 15:
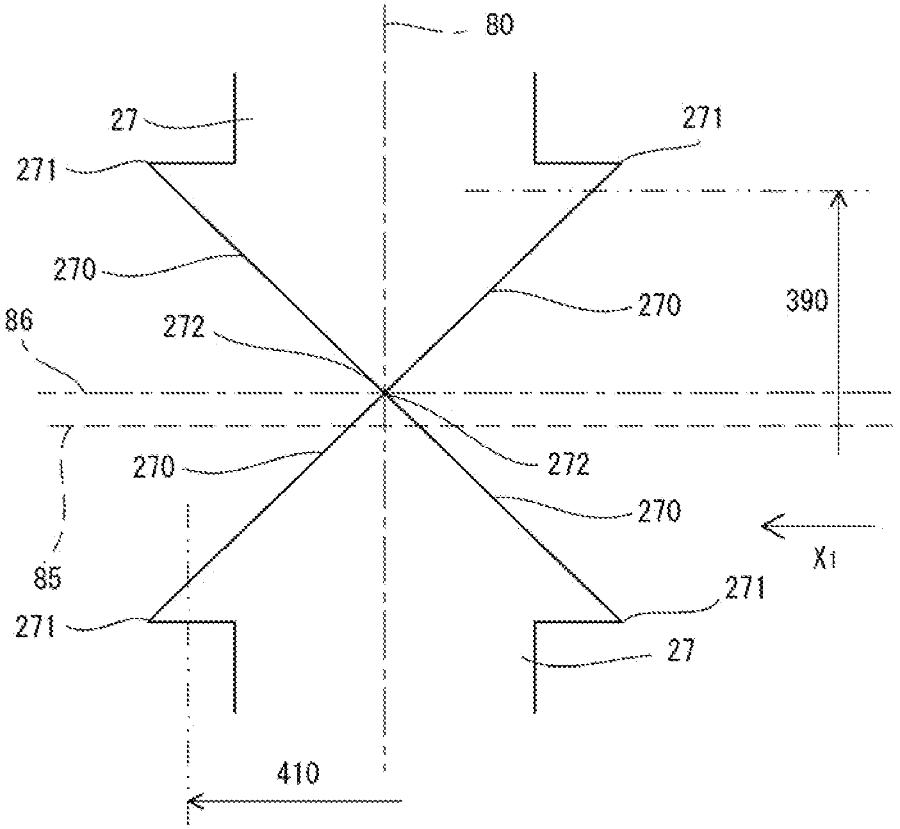
FIG. 15 illustrates a pair of temporary sealed sections.

FIG. 15 illustrates a pair of temporary sealed sections 27 in the case where no margin 84 of FIG. 14B is generated. If the actual division line 85 of the panel web 1 (that is, the position where the perforations 22 are actually formed or will be formed) is shifted from the designed division line 86 due to such as meandering of the panel web 1, the division line 85 will be shifted from the tip corner 272 of the temporary seal and run across the tip portion of one of the temporary sealed sections 27. As a result, the creases of the open surfaces 32 may fail to be formed properly.

If the longitudinal heat sealed area 390 is shifted due to meandering of the panel web 1 such that any of the corners 271 of the temporary sealed sections 27 is located outside the longitudinal heat sealed area 390, the seal shape will be misshapen. Similarly, if any of the corners 271 is located outside of the horizontal heat sealed area 410, the seal shape will also be misshapen.

Figure 16:
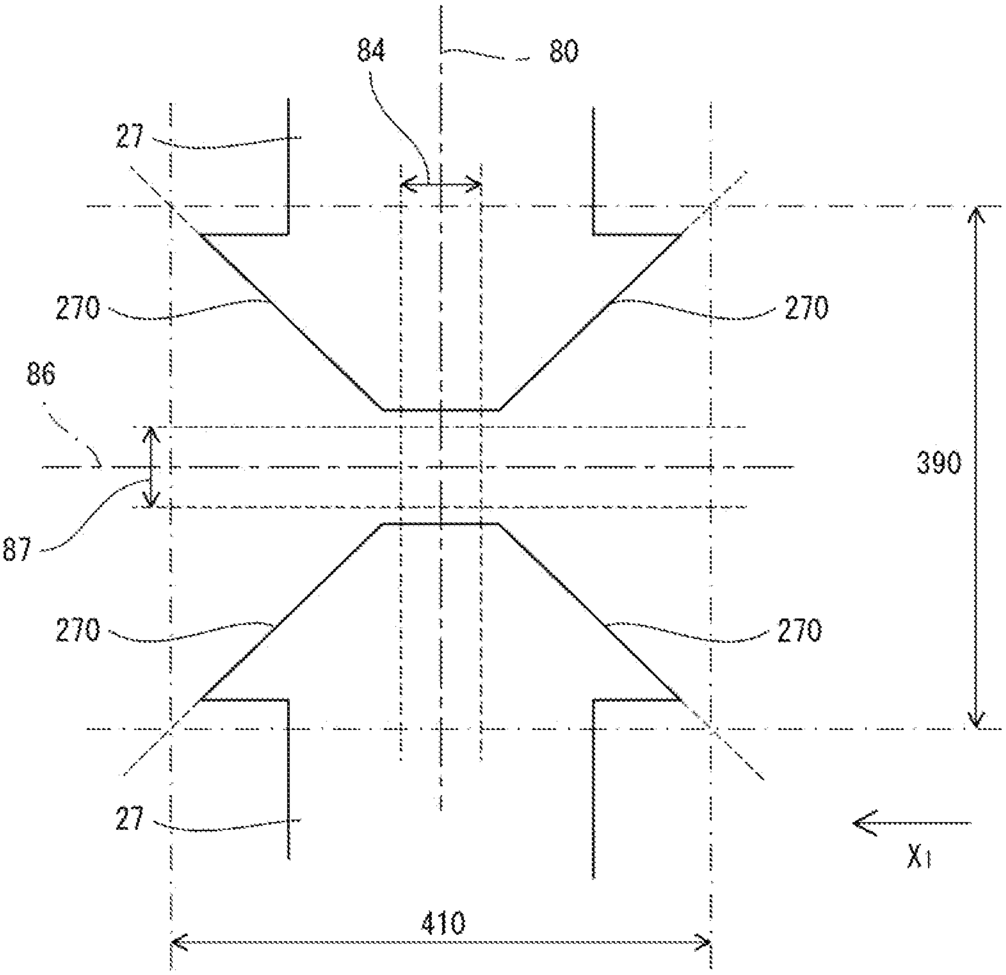
FIG. 16 illustrates another example of a pair of temporary sealed sections.

FIG. 16 illustrates a pair of temporary sealed sections 27 to avoid said problem. The tip portion of each temporary sealed section 27 is trapezoidal instead of triangular and are not included in the margin 87 which extends in the feed direction $X_1$ and will be formed by the slit device 43. This allows accurate creases to be formed from the slant lines 270 when forming the open surfaces 32. If the trapezoidal tip portion is fully included in both longitudinal and cross heat-seal areas 390 and 410, a proper seal shape is ensured. In particular, the intersection of the outer edges of the vertical and horizontal heat sealed areas 390 and 410 is preferably located on the extension line of the slant lines 270. This enhances the quality of the bags 5, and also their appearance and finish.

The size of the tip portion of the temporary sealed section 27 is determined based on the meandering of the panel webs 1 and 2, the accuracy of the intermittent feed and the widths of the margins 84 and 87, etc., such that the above requirements are met.

What is claimed is:

1. An apparatus for making plastic bags, the apparatus comprising:

a panel web feed device superposes a first panel web and a second panel web on each other and feeds the first and second panel webs in a longitudinal direction of the first and second panel webs;

a side gusset supply device supplies a side gusset to the first or second panel web to dispose the side gusset in a width direction of the first and second panel webs before superposing of the first and second panel webs, wherein the side gusset is interposed between the first and second panel webs when the first and second panel webs are superposed on each other, the side gusset being folded in halves on opposite sides with respect to a longitudinal centerline thereof;

a line-of-weakness forming device disposed downstream of a position where the panel web feed device superposes the first and second webs on each other, to form a first line of perforations in the first panel and a second line of perforations in the side gusset, the first line of perforations extending in the longitudinal direction of the first and second panel webs, the second line of perforations extending in a width direction of the side gusset and aligned with the first line of weakness;

a temporary seal device seals the side gusset to the first and second panel webs so as to form temporary sealed sections after the superposing of the first and second panel webs;

a first guide device guides the first panel web as the first and second panel webs are fed to divide the first panel web along the first line of perforations to fold the first panel web on sides of division edges of the first panel web along fold lines, and to cut the side gusset open along the second line of perforations for forming open surfaces, the fold lines extending in the longitudinal direction of the first and second panel webs; and an end face web supply device supplies an end face web to the first panel web as the first and second panel webs are fed to superpose the end face web on folded parts of the first panel web and the open surfaces in the longitudinal direction of the first and second panel webs, the line-of-weakness forming device comprising:

an arm supported at one end thereof to be pivotable around a pivot shaft extending in the width direction of the first and second panel webs;

a disk-shaped perforation cutter for forming the first and second lines of perforations, wherein the disk-shaped perforation cutter includes a rotation shaft extending in the width direction of the first and second panel webs, and is supported by the arm to be rotatable around the rotation shaft;

a biasing member disposed to bias the arm in a direction in which the disk-shaped perforation cutter is away from a feed plane of the first and second panel webs; and an adjustment member allows adjustment of cutting depth of the disk-shaped perforation cutter into the first panel web and the side gusset, wherein the adjust member is in contact with the arm to prevent the arm from being moved around the pivot shaft by the biasing member.

2. The apparatus of claim 1, wherein the biasing member is a spring.

3. The apparatus of claim 1, wherein the adjustment member is rotatably supported around an axis thereof by a support member, and wherein the adjustment member is movable with respect to the support member in a direction toward or away from the arm upon rotation around the axis.

4. The apparatus of claim 3, wherein the adjustment member is coupled to the support member via screw engagement.

5. The apparatus of claim 4, wherein the adjustment member is an adjustment knob.

* * * * *